Figure 1:
Figure 7:
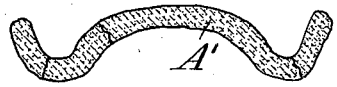
Figure 2:
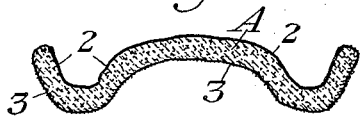
Figure 8:
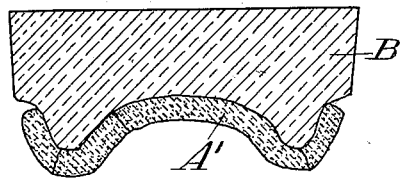
Figure 3:
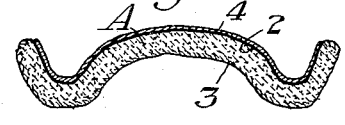
Figure 9:
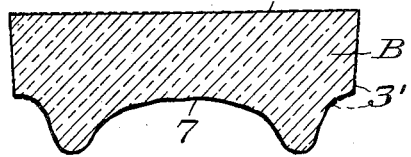
Figure 4:
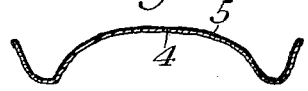
Figure 10:
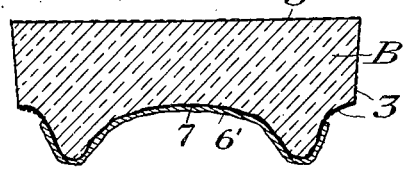
Figure 5:
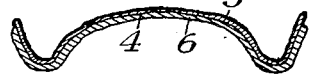

Dec. 28, 1926.

T. BUENAVENTURA 1,612,605

PROCESS OF MAKING ARTIFICIAL DENTURES

Filed April 6, 1923  2 Sheets-Sheet 1

INVENTOR
Thomas Buenaventura
By Byrnes, Stebbins & Parmelee
His Atty's

Dec. 28, 1926.
T. BUENAVENTURA
1,612,605
PROCESS OF MAKING ARTIFICIAL DENTURES
Filed April 6, 1923    2 Sheets-Sheet 2

INVENTOR
Thomas Buenaventura
By Byrnes, Stebbins & Parmelee
His Atty's

Patented Dec. 28, 1926.

1,612,605

UNITED STATES PATENT OFFICE.

THOMAS BUENAVENTURA, OF NEW YORK, N. Y.

PROCESS OF MAKING ARTIFICIAL DENTURES.

Application filed April 6, 1923. Serial No. 630,377.

The present invention relates to the art of dentistry, and more particularly to an improved artificial denture and process of making the same.

Artificial dental work may be divided into two classes—metallic and non-metallic. Metallic dental work has heretofore been done by two main processes, to-wit, either casting or swaging. Neither of these processes has proved entirely satisfactory. In the casting process, difficulties arise because of the expansion and contraction of the materials, especially when the work is of varying thickness, as is usually the case. The swaging process is perhaps less accurate than the casting process, because the blows upon the work mar the high points and ultimately distort the die. Even if several dies and counter-dies are made, it is not possible to impress upon hard metal the firm and sharp lines of the mouth.

By the present invention, a process is provided which involves the formation of a base-plate by the deposition of a layer of metal on a surface which is an exact replica of the portion of the mouth for which the denture is desired, and, after setting the teeth thereon, reinforcing said plate, either by means of a light forged plate or plates, or by the deposition of another layer of metal thereon. While I prefer to form said base-plate by the electrodeposition of metal, it will be understood that said plate may be formed by depositing the metal in any other suitable manner, as by spraying or precipitation. The invention also involves, among other features, formation of said replica by the deposition of metal on the face of an impression of the desired part of the mouth, and also securing of the reinforcing plate to the base plate by the deposition of metal between the opposed surfaces of said plates, or in perforations in said reinforcing plate.

In the accompanying drawings there are shown, for purposes of illustration only, certain preferred embodiments of my invention, it being understood that the drawings do not define the limits of my invention, as changes may obviously be made in the steps disclosed herein, and in the manner and order of carrying out the same, without departing from the spirit of the invention or scope of my broader claims.

Figure 11:
Figure 12:
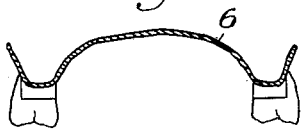
Figure 13:
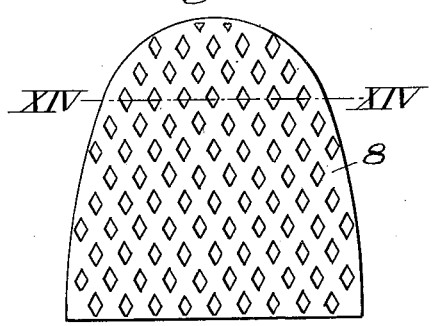
Figure 14:
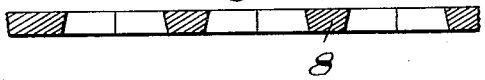
Figure 15:
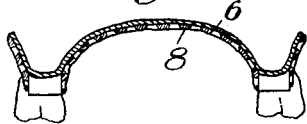
Figure 16:
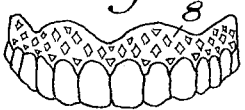
Figure 17:
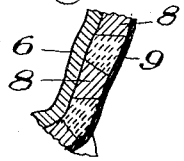
Figure 18:
Figure 19:
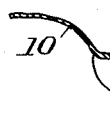
Figure 20:
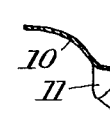
Figure 21:
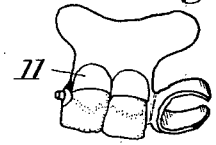
Figure 22:
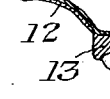

In the drawings:

Figures 1 to 6, inclusive, are sectional views illustrating successive steps for obtaining a base-plate in accordance with one embodiment of my invention, Figures 7 to 10, inclusive, are sectional views illustrating successive steps in a modified method for obtaining such plate, Figure 11 is a perspective view of a tooth having a metal backing, Figure 12 is a sectional view illustrating the base-plate with teeth temporarily secured thereto, Figure 13 is a plan view of a perforated reinforcing plate, Figure 14 is a fragmentary sectional view, on an enlarged scale, taken on the line XIV—XIV of Figure 13, Figure 15 is a sectional view showing the perforated reinforcing plate shaped to and fitted in position on the base-plate, Figure 16 is a front view of the denture illustrating the perforated reinforcing plate on the labial and buccal surfaces thereof, Figure 17 is a fragmentary sectional view illustrating a coating of pink gold on the labial and buccal surfaces of the reinforcing plate, and Figures 18 to 23, inclusive, illustrate successive steps in accordance with another embodiment of my invention for making a partial denture.

Referring first to Figures 1 to 6, inclusive, an impression A in plaster is taken of the portion of the mouth for which the denture is desired. The face of this impression is given a coating 2 of material, such as graphite, which is a good conductor of electricity, and the remainder of the surface of said impression is coated with a dielectric substance 3. The coated impression is now placed in a suitable electrolytic bath, and a layer of metal deposited thereon to produce a negative 4 of the impression. The metal negative 4 is then removed from the impression and coated with a dielectric substance 5, leaving uncoated, however, the face which was in contact with the impression, or so much of said face as it is desired to form a base-plate on. The negative is then placed in a suitable electrolytic bath, and a base-plate 6 built on the uncoated face thereof by the electrodeposition thereon of a suitable alloy, preferably an alloy of gold, silver and nickel, metallic deposits formed by electrodeposition being stronger when composed of a plurality of cations. When the base-plate has reached the desired thickness, it is taken out of the bath, and the negative 4 removed therefrom by etching and dissolving it with an acid that does not affect the base-plate. The base-plate 6, after removal therefrom of the negative 4, is illustrated in section in Figure 6. This base-plate is necessarily a facsimile of the part of the mouth of which the impression was taken.

Figure 6:
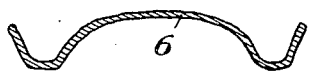

Although the method above described, whereby a base-plate is obtained by electrodeposition of an alloy upon an electrodeposited metallic negative of a plaster impression, is to be preferred, if the impression has been broken in taking it out of the mouth, or if it has been taken in a plastic material, an alternative method, illustrated in Figures 7 to 10, inclusive, may be followed for obtaining the base-plate illustrated in Figure 6. Referring to these figures, A' indicates a plaster impression similar to the impression A, but which has been broken, as indicated, in taking it out of the mouth. A plaster cast B is made of the impression A'. This cast is a negative of the impression A', just as the plate 4 is a negative of the impression A.

After allowing sufficient time for setting and hardening, the cast is separated from the impression and thin metal foil 7, preferably of gold, pressed on its face. This metal foil is smoothed and shaped over the surface upon which the base-plate is to be built, and is projected about one-quarter of an inch beyond the outline of said base-plate. The remaining surface of the cast is coated with a dielectric substance 3', the edge portions of the foil also being coated therewith, as far as the outline of the desired base-plate. The cast is now placed in a suitable electrolytic bath, and a base-plate 6' built thereon by electrodeposition.

The base-plate 6 or 6' having been produced by either of the above described alternative methods, the next operation is the setting of the teeth, which may be done in the usual manner in an anatomical articulator, preferably using interchangeable teeth having a metal backing, such as illustrated in Figure 11. In setting the teeth, care must be taken that the sticking material used does not cover any portion of the lingual or palatal surfaces of the base-plate or any portion of the sides of the metal backing. A base-plate with teeth temporarily secured thereto is illustrated in section in Figure 12.

After setting the teeth, the base-plate is tried in the mouth, and if perfect, an impression of its labial, buccal and lingual surfaces is taken in plaster or any other suitable material. Then low-fusing metal is cast in the impression to obtain a die corresponding to the base-plate with the teeth thereon. Another method for obtaining such die is to make a sand mold of the base-plate and cast a die of hard metal in said mold.

Having made the die, as above described, the next step is to provide a reinforcing plate for the base-plate. A perforated plate 8 of rolled metal, as indicated in Figures 13 and 14, is annealed, trimmed and swaged, or otherwise conformed to the shape of the die. The outer surface of the plate is coated with a dielectric substance, care being taken that the surface which is to come next to the base-plate and the perforations are perfectly clean. Then the reinforcing plate is placed and properly held in position on the base-plate and firmly united to the base-plate by electrodepositing metal between their opposed surfaces and in said perforations. At the same time, the metal backings of the teeth are firmly united to the reinforcing plate by electrodeposition of metal in the perforations of said reinforcing plate.

While I have referred to a single reinforcing plate, it will be understood that said plate may be made in separate sections. For example, one section may cover the lingual surfaces of the base-plate, and another section or sections the labial and buccal surfaces of said plate. Also, while I prefer to use teeth having a metal backing, either stationary or removable, because, after they have been set in the right position, they are securely united to the plate without the slightest motion, teeth without a metal backing may be used, in which case, after the reinforcing plate or plates have been united to the base-plate by electroplating, the teeth are removed by placing the denture in hot water for a few minutes, and are afterwards cemented back in their respective sockets.

The denture is finished by electroplating the labial and buccal surfaces of the reinforcing plate with gold in a special bath to produce a pink hue approaching as near as possible to the color of the gums. Figure 17 is a fragmentary sectional view, on an enlarged scale, illustrating the plating 9 of pink gold on the labial and buccal surfaces.

Figure 23:
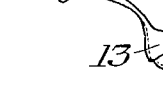

Figures 18 to 23, inclusive, illustrate my improved process as applied to the making of bridges or partial dentures. For such work, I make a very thin base-plate 10 of a nickel-iron alloy by the same process as described for making a complete denture, and temporarily secure the teeth thereon. Teeth without a metal backing may be used in this kind of work, but they should be covered with metal foil 11, such as gold leaf, whereby an encasement may be formed by electroplating, in which the teeth may be cemented. The teeth are set in the right positions and the covering foil smoothed downward on the base-plate. The base-plate and the metal foil are then electroplated in a nickel-iron bath, forming a reinforcing layer 12 on the base-plate and metal encasements or sockets 13 for the teeth. The teeth are cemented in these sockets. The edges of the reinforcing base plate and the bases of the sockets 13 may be thickened by electroplating, the remainder of the surface of the plate being coated with a dielectric substance. The finished partial denture is illustrated in Figure 23, the thickened portions being indicated by dotted lines.

An important advantage of my improved process is that thoroughly accurate work may be produced, because the surface of the work which conforms to the part of the mouth for which the denture is made is produced automatically by the electrodeposition of metal. The personal skill of the artisan does not, therefore, affect this part of the work.

Another advantage of the invention is that it provides a process wherein no high mechanical skill is required to perform its various operations.

Forming the base-plate by electrodeposition of metal and afterwards reinforcing it with a forged light plate or plates of very tough and resilient metal united to the base-plate by electrodeposition of metal through perforations, preferably bevel-edged to insure riveting grip, in said reinforcing plate or plates, is particularly advantageous, because, by choosing a suitable metal or alloy, the base-plate can be made comparatively thin, in fact, only strong enough to withstand the stress of uniting the teeth and the trial in the mouth without distortion, and the reinforcing plate or plates afford a firm and secure anchorage for the teeth. The complete denture can, therefore, be finished comparatively light, while affording all the necessary strength.

While it is contemplated that within the scope of this invention, the formation of parts requiring the deposition of metal may be produced in ways other than by electrodeposition, particular advantages arise from employing electrodeposition of metal, in that a uniform layer or deposit is insured, the deposit receiving surface is not subjected to any objectionable temperature conditions or changes, and the metallic covering is formed without setting up mechanical strains therein.

I claim:

1. In a process for making artificial dentures, the steps consisting in taking an impression of a portion of the mouth, forming a negative of said impression by the deposition of a layer of metal on the face thereof, and forming a metallic base plate as a positive of said negative.

2. In a process for making artificial dentures, the steps consisting in taking an impression of a portion of the mouth, forming a negative of said impression by the electrodeposition of a layer of metal on the face thereof, and forming a metallic base plate as a positive of said negative.

3. In a process for making artificial dentures, the steps consisting in taking an impression of a portion of the mouth, covering the face of said impression with material which is adapted to cause the adherence of a layer of metal thereto, forming a negative of said impression by the deposition of a layer of metal on said covered face, and forming a metallic base plate as a positive of said negative.

4. In a process for making artificial dentures, the steps consisting in taking an impression of a portion of the mouth, covering the face of said impression with material which is a good conductor of electricity, forming a negative of said impression by the electrodeposition of a layer of metal on said covered face, and forming a metallic base plate as a positive of said negative.

5. In a process for making artificial dentures, the steps consisting in taking an impression of a portion of the mouth, covering the face of said impression with material which is a good conductor of electricity, coating the remaining surface of said impression with a dielectric substance, forming a negative of said impression by the electrodeposition of a layer of metal on said covered face, and forming a metallic base plate as a positive of said negative.

6. In a process for making artificial dentures, the steps consisting in taking an impression of a portion of the mouth, forming a negative of said impression of material which is a good conductor of electricity, and building a base-plate on said negative by the electrodeposition of metal on the face thereof.

7. In a process for making artificial dentures, the steps consisting in taking an impression of a portion of the mouth, forming a metallic negative of said impression, and building a base-plate on said negative by the electrodeposition of metal on the face thereof.

8. In a process for making artificial dentures, the steps consisting in taking an impression of a portion of the mouth, forming a negative of said impression by the deposition of a layer of metal on the face thereof, and building a base-plate on said negative by the deposition of metal on the face thereof.

9. In a process for making artificial dentures, the steps consisting in taking an impression of a portion of the mouth, forming a negative of said impression by the electrodeposition of a layer of metal on the face thereof, and building a base-plate on said negative by the electrodeposition of metal on the face thereof.

10. In a process for making artificial dentures, the steps consisting in taking an impression of a portion of the mouth, forming a negative of said impression by the electrodeposition of a layer of metal on the face thereof, removing said negative from said impression, forming a base-plate by the electrodeposition of metal upon the face of said negative, and removing said negative from said base-plate.

11. In a process for making artificial dentures, the steps consisting in taking an impression of a portion of the mouth, forming a negative of said impression by the electrodeposition of a layer of metal on the face thereof, removing said negative from said impression, forming a base-plate by the electrodeposition of metal upon the face of said negative, and removing said negative from said base-plate by etching and dissolving said negative in an acid which does not affect said base-plate.

12. In a process for making artificial dentures, the steps consisting in taking an impression of a portion of the mouth, forming a negative of said impression, building a base-plate on said negative by the electrodeposition of metal on the face thereof, removing said negative from said base-plate, mounting teeth on said base-plate, and reinforcing said base-plate.

13. In a process for making artificial dentures, the steps consisting in taking an impression of a portion of the mouth, forming a negative of said impression, building a base-plate on said negative by the electrodeposition of metal thereon, separating said negative from said base-plate, mounting teeth on said base-plate, conforming a reinforcing plate to said base-plate, and permanently uniting said reinforcing plate to said base-plate.

14. In a process for making artificial dentures, the steps consisting in taking an impression of a portion of the mouth, forming a negative of said impression, building a base-plate on said negative by the deposition of metal thereon, removing said negative from said base-plate, mounting teeth on said base-plate, conforming a reinforcing plate to said base-plate, and permanently uniting said reinforcing plate to said base-plate by the deposition of metal.

15. In a process for making artificial dentures, the steps consisting in taking an impression of a portion of the mouth, forming a negative of said impression, building a base-plate on said negative by the electrodeposition of metal thereon, removing said negative from said base-plate, mounting teeth on said base-plate, conforming a reinforcing plate to said base-plate, and permanently uniting said reinforcing plate to said base-plate by the electrodeposition of metal.

16. In a process for making artificial dentures, the steps consisting in taking an impression of a portion of the mouth, forming a negative of said impression, building a base-plate on said negative by the electrodeposition of metal on the face thereof, removing said negative from said base-plate, mounting teeth on said base-plate, conforming a perforated reinforcing plate to said base-plate, and permanently uniting said reinforcing plate to said base-plate by the electrodeposition of metal between the opposed surfaces of said plates and in said perforations.

17. In a process for making artificial dentures, the steps consisting in taking an impression of a portion of the mouth, forming a negative of said impression, building a base-plate on said negative by the electrodeposition of metal on the face thereof, removing said negative from said base-plate, mounting teeth on said base-plate, conforming a perforated reinforcing plate to the labial and buccal surfaces of said base-plate, permanently uniting said reinforcing plate to said base-plate by the electrodeposition of metal in the perforations of said reinforcing plate, and electroplating selected portions of said reinforcing plate with a metal substance to give the desired tint.

18. In a process for making artificial dentures, the steps consisting in forming a base-plate by the deposition of metal on a surface which is a replica of the portion of the mouth for which the denture is desired, mounting teeth on said base-plate, casting a die corresponding to said base-plate with the teeth thereon, forging a reinforcing plate for said base-plate on said die, mounting said reinforcing plate on said base-plate, and permanently uniting said plates.

19. In a process for making artificial dentures, the steps consisting in forming a base-plate by the deposition of metal upon a surface which is a replica of the portion of the mouth for which the denture is desired, mounting a tooth on said base-plate, and securing to said base-plate by deposition of metal a socket for said tooth.

20. In a process for making artificial dentures, the steps consisting in forming a base-plate by the deposition of metal upon a surface which is a replica of the portion of the mouth for which the denture is desired, mounting a tooth on said base-plate and reinforcing said base-plate, and simultaneously securing thereto a socket for said tooth by the deposition of metal.

21. In a process for making artificial dentures, the steps consisting in forming a base-plate by the deposition of metal upon a surface which is a replica of the portion of the mouth for which the denture is desired, mounting a tooth on said base-plate, and reinforcing said base-plate.

22. In a process for making artificial dentures, the steps consisting in forming a base-plate by the deposition of metal upon a surface which is a replica of the portion of the mouth for which the denture is desired, conforming a reinforcing plate to said base-plate, and permanently uniting said plates by the deposition of metal.

23. In a process for making artificial dentures, the steps consisting in forming a base-plate by the electrodeposition of metal upon a surface which is a replica of the portion of the mouth for which the denture is desired, conforming a reinforcing plate to said base-plate, and permanently uniting said plates by the electrodeposition of metal.

24. In a process for making artificial dentures, the steps consisting in forming a base-plate by the electrodeposition of metal upon a surface which is a replica of the portion of the mouth for which the denture is desired, forging a reinforcing plate to conform to said base-plate, and permanently uniting said plates by the electrodeposition of metal between their opposed surfaces.

25. In a process for making artificial dentures, the steps consisting in forming a base-plate by the electrodeposition of metal upon a surface which is a replica of the portion of the mouth for which the denture is desired, forging a perforated reinforcing plate to conform to said base-plate, and permanently uniting said plates by the electrodeposition of metal in said perforations.

26. In a process for making artificial dentures, the steps consisting in forming a base-plate by the electrodeposition of metal upon a surface which is a replica of the portion of the mouth for which the denture is desired, setting teeth having a metal backing on said base-plate, positioning a reinforcing plate on said base-plate having portions covering the sides of said metal backings, and permanently uniting said plates to each other and said teeth to said reinforcing plate by the electrodeposition of metal.

27. In a process for making artificial dentures, the steps consisting in forming a base-plate of metal to conform to the portion of the mouth for which the denture is desired, setting a tooth on said base-plate, and electroplating selected portions or areas of the denture with metal to give them the desired tint.

28. In a process for making artificial dentures, the steps consisting in forming a base-plate by the electrodeposition of an alloy consisting substantially of iron and nickel in suitable proportions upon a surface which is a replica of the portion of the mouth for which the denture is desired, setting a tooth on said base-plate, and electroplating said base-plate with the same alloy to reinforce the same.

29. In a process for making artificial dentures, the steps consisting in forming a base-plate to conform to the portion of the mouth for which the denture is desired, setting a tooth on said base-plate, covering the exposed surfaces of the base portion of said tooth with material which is a good conductor of electricity, and forming a socket for said tooth by the electrodeposition of metal upon said covered portion thereof.

30. In a process for making artificial dentures, the steps consisting in forming a base-plate to conform to the portion of the mouth for which the denture is desired, setting a tooth on said base-plate, covering the exposed surfaces of the base portion of said tooth with material which is a good conductor of electricity, and forming a socket for said tooth and a reinforcement for said base-plate by the electrodeposition upon the covered portion of said tooth and upon said base-plate of an alloy consisting substantially of iron and nickel in suitable proportions.

31. In a process for making artificial dentures, the steps consisting in forming a base-plate to conform to the portion of the mouth for which the denture is desired by the electrodeposition of an alloy consisting substantially of iron and nickel in suitable proportions, setting a tooth on said base-plate, covering the exposed surfaces of the base portion of said tooth with metal foil, and forming a socket for said tooth and a reinforcement for said base-plate by the electrodeposition of said iron-nickel alloy upon the covered portion of said tooth and upon said base-plate.

32. The process of making a metallic artificial denture, comprising forming separate metallic sections of the desired shape, and then permanently uniting said sections by the electrodeposition of metal through perforations formed in certain of said sections.

33. The process of making a metallic artificial denture, comprising forming separate metallic sections of the desired shape, and then permanently uniting said sections by the electrodeposition of metal through perforations formed in certain of said sections and having undercut edges.

34. The process of making a metallic artificial denture, comprising forming separate metallic sections of the desired shape, certain of said sections being formed by the electrodeposition of metal, and permanently uniting said sections by the electrodeposition of metal.

35. The process of making a metallic artificial denture, comprising forming separate metallic sections of the desired shape, certain of said sections being formed by the electrodeposition of a metal, and permanently uniting said sections by the electrodeposition of metal through perforations formed in certain of said sections.

In testimony whereof I have hereunto set my hand.

THOMAS BUENAVENTURA.